June 28, 1966  R. R. MILLER, JR  3,258,278
LIGHTWEIGHT FLUID COUPLING SYSTEM
Filed June 17, 1960  2 Sheets-Sheet 1

INVENTOR.
RUDOLPH R. MILLER, JR.
BY Duane C. Bowen
ATTORNEY

June 28, 1966   R. R. MILLER, JR   3,258,278
LIGHTWEIGHT FLUID COUPLING SYSTEM
Filed June 17, 1960   2 Sheets-Sheet 2

INVENTOR.
RUDOLPH R. MILLER, JR.
BY Duane C. Bowen
ATTORNEY

United States Patent Office 3,258,278
Patented June 28, 1966

3,258,278
LIGHTWEIGHT FLUID COUPLING SYSTEM
Rudolph R. Miller, Jr., Tulsa, Okla., assignor to Boeing Airplane Company, Wichita, Kans., a corporation of Delaware
Filed June 17, 1960, Ser. No. 36,894
11 Claims. (Cl. 285—39)

My invention relates to a lightweight fluid coupling system particularly adapted for aircraft requirements where weight is a fundamental consideration and where fluid systems are subjected to both high-frequency low-magnitude vibration and low-frequency large-magnitude flexing. Fundamental to the invention are unique radiused metal sealing surfaces providing superior sealing and acceptance of tube misalignment yet adapted to thin-shelled, lightweight couplings. The couplings are characterized by minimum weight in all details including thin-shelled nuts having a wrenching system adapted to prevent crushing.

The system used most often in aircraft work commonly is called the AN coupling. Examples used for comparison herein are AN 815-8-9-20D union and AN 821-20D elbow fitting in 1¼″ sizes made from 24ST6. These are heavy articles, compared with my couplings, and are used in considerable quantity on each aircraft. A significant reduction in coupling weights would result in a sizable weight saving on an aircraft. Some efforts have been made in the past to provide a lower weight, thin-shelled design but some needed characteristics have been lacking, such as an adequate sealing including adaptation to tube misalignment, vibration resistance, burst strength, and prevention of crushing during torquing.

The objects of my invention include: to provide an improved fluid coupling system of lower weight than AN fittings and providing a superior metal-to-metal seal, adaptable to tubing misalignment, of adequate burst strength, withstanding aircraft environmental vibration and flexing, and subject to torquing without distortion; and to devise a fitting having, in addition to the above characteristics, flexibility in design for forming T's, Y's, elbows and the like, economy of manufacture, simplicity of inspection and maintenance, self-locking, and space conservation.

My invention will be best understood, together with additional objectives and advantages thereof, from the following description, read with reference to the drawings, in which.

Figure 8:
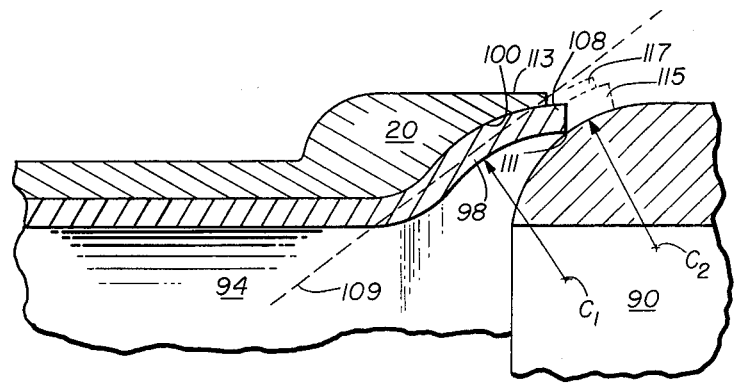
Figure 9:
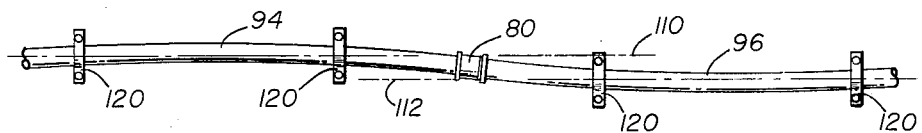

FIGURE 8 is an enlarged, fragmentary sectional view showing the coupling union metal-to-metal sealing surfaces, the full lines indicating part positions when the union is assembled and the partial dotted lines indicating the stretching of the tube flare over a central annulus occurring as the coupling is tightened; and FIGURE 9 is a plan view of a test setup for use of a coupling system in conditions of tube misalignment.

Figure 1:
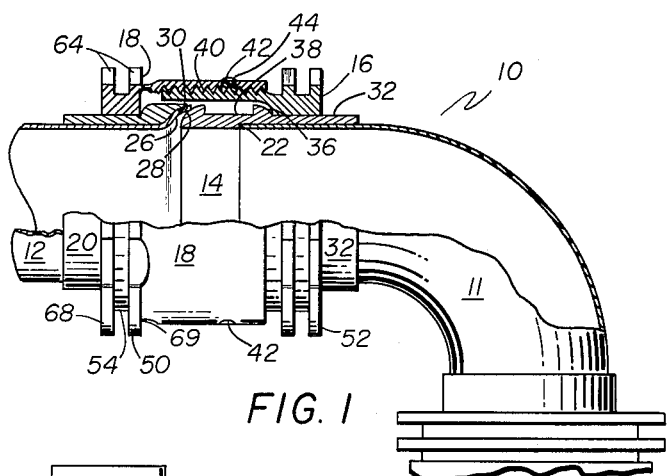
FIGURE 1 is a view, with portions broken away and shown in section, of an elbow fitting forming a specific embodiment of my invention.

*FIGURE 1.—Elbow*

FIGURE 1 shows an elbow fitting 10 constructed according to my coupling system. The bend is formed by tubing 11 which may be formed in a suitable way such as by bending a length of tubing or by forming two hammered halves and welding or soldering them together. The assembly is commonly identical at each end of the elbow or each branch of other fittings. The fitting usually is joined to straight lengths of tubing, such as 12. The structure includes an annular member 14, a gland stud 16, a gland nut 18, and a sleeve 20.

Annulus 14 has a counterbore 22 in which the end of elbow tubing 11 is received and is secured as by brazing. The various parts can be made from steel, aluminum, titanium, or other suitable metal or alloy. The example given for the union and fittings shown is 24ST6. The method of securing the tubular parts of a fitting together, if divided, and the method of securing the tube ends within annulus 14 will depend on the metals used and may be by soldering, welding, or other suitable means. The interior diameters of annulus 14 and tube 11 are preferably equal and no significant joint is presented to disturb fluid flow. The elbow of FIGURE 1 with its smoothly curved bend, having a minimum of fluid flow disturbance, may be contrasted with an AN 821-20D elbow in which right angular passageways are bored from a block of metal and fluid flow characteristics are poor.

Annular member 14 and the end of tubing 12 have mating surfaces comprising a radiused or generally spherical end surface 28 on annulus 14 and a radiused flare 26 on tube 12. The radius of annulus 14 is substantially a quarter of a circle in radial cross section. The radiused sealing surface configuration is a feature of primary importance in achieving a superior seal in a coupling of minimum weight and will be discussed in greater detail in connection wtih FIGURE 8. Seals in the AN and most other comparable couplings have had conically flared mating surfaces that have inferior sealing characteristics both in installations having mating tubes closely axially aligned and in installations having more substantial axial misalignment between tubes.

Aircraft systems are subjected to an environment of high-frequency low-amplitude vibration and of low-frequency large-magnitude flexing. Although the use of sleeve 20 adds to the weight of the fitting and some prior couplings have omitted the use of sleeves, this feature is regarded as necessary in aircraft. The sleeve generally fits the cylindrical portion of tube 12 and has a radiused inner end surface 30 generally matching and abutting the exterior surface of flange 26 on tube 12. Both the tube flare and the inner surface of the sleeve have ogee curves but the outer radius is the important surface in sealing, the inner radius being for manufacturing convenience and strength characteristics as compared with a more abrupt bend.

The interior surface of gland nut 18 generally conforms to the portions of sleeve 20 it abuts. Annulus 14 has on its end opposite spherical surface 28 a sleeve portion 32 having the same supportive relationship against vibration to tube 11 that sleeve 20 has to tube 12. At the inner end of sleeve 32 is a rounded shoulder 36. Gland stud 16 has an interior surface generally conforming to sleeve 32 and shoulder 36. Annulus 14 is lightened by a groove 38 between radiused end surface 28 and shoulder 36. Stud 16 is threaded into nut 18, the threaded engaging areas being shown at 40. Locking of the nut and stud is accomplished by nylon plugs 42 fitted in outwardly tapered openings 44 in nut 18 and engaging stud 16 in the area of threaded connection 40.

*Figures 2-5.—Wrenching surfaces*

A substantial portion of coupling weights is accounted for by wrenching areas. A common approach in AN and other couplings is to use conventional hexagonal wrenching surfaces. A hexagonal nut is subjected to crushing forces during wrenching and hence hexagonal nuts are bulky not only because of the protruding corners but also by requirement of a heavy body to resist such crushing. I have minimized weight by the nut and wrenching system shown particularly in FIGURES 2–5.

The nut surfaces 50, 52 on nut 18 and stud 16 are identical so only the nut 18 will be described in detail. A central annular groove 54 is provided to receive tangs 56 and 58 extending inwardly from the semicircular interior face 61 of a special spanner wrench 60 that is used on the nut. The groove and tangs prevent slipping of the wrench off the nut with possible injury to the coupling, to other articles or to the mechanic. Force applied through a torque wrench has a turning action that aggravates side slippage of the nut-engaging wrench piece. Wrench 60 has formed integral with tang 56 a broader rectangular lug 62 that engages in the recesses 64 of a pair of flanges 68, 69 bordering groove 54. Recesses 64 are rectangularly configured with flat bottoms normal to radials of the flanges and with parallel end walls. The other end of handle 70 of wrench 60 has a boss 72 having a square opening 74 to fit the end of a torque wrench. Upon application of torque, lug 62 acts in the various recesses 64 it engages and the semicircular interior surface 61 abuts the edges of flanges 68, 69. The system is designed so that the nut shell will fail in torsion and not by distortion to the shell. By this structure, the nuts can have relatively thin shells compared to hexagonal nuts. The wrench can not be installed incorrectly, the wrench can not slip, and spalling of the contact faces is prevented because of tangs 56, 58.

Figure 6:
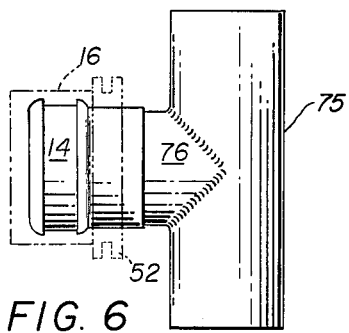
FIGURE 6 is a plan view showing in full lines a coupling part secured to one branch of a T fitting and indicating other parts of the coupling in dottted lines.
Figures 4, 5:
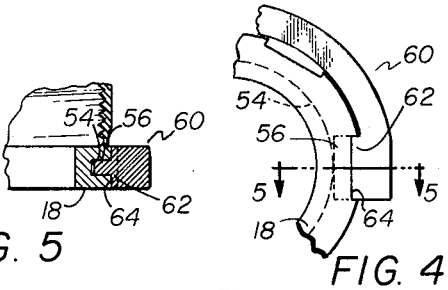
FIGURE 4 is a fragmentary view of portions of the coupling nut and wrench in engagement.
FIGURE 5 is a sectional view taken on line 5—5 of FIGURE 4.
Figure 2:
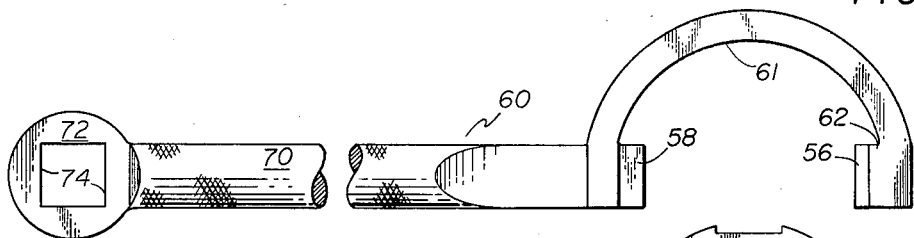
FIGURE 2 is a plan view of the coupling wrench.
Figure 3:
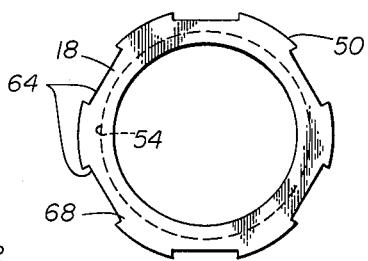
FIGURE 3 is an end view of the coupling nut.

*Figure 6.—T*

FIGURE 6 shows the application of my fitting to a T 75 in which the annular member 14 is connected to one branch 76 of the T. The stud 16 is shown in phantom so that annulus 14 is clearly shown. An annulus 14 normally would be installed on each branch of the T. The showing of the FIGURE 1 elbow and the FIGURE 6 T indicates the general adaptability of my coupling system to fabrication of fittings from tubular stock, except for the operative coupling pieces. The T is indicated as being formed by a tube 76 welded to a straight tube with a mitered type junction. Application of the coupling systems to other fittings such as Y's, Christmas trees, mitered elbows and the like will be understood.

Figure 7:
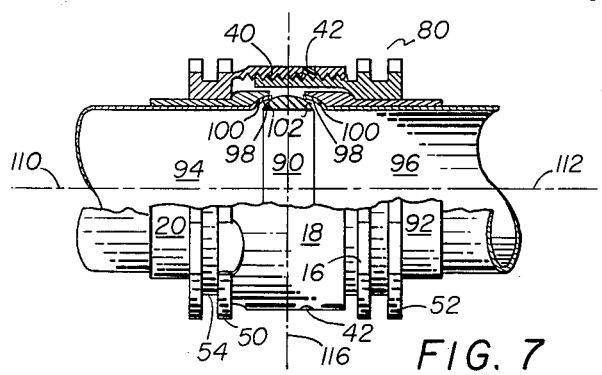
FIGURE 7 is a view similar to FIGURE 1 but illustrating application of the invention to a union.

*Figure 7.—Union*

FIGURE 7 shows the adaptation of the system to a union 80. Certain parts are identical and interchangeable with parts shown and described in connection with FIGURE 1 and these will be given the same reference characters: sleeves 20, nut 18, stud 16, nylon plugs 42, and nut surfaces 50, 52. The different parts include an annulus 90 and a second sleeve 92 that is identical to the sleeve 20 shown in FIGURE 1 and on the other end of union. Two straight tube sections 94, 96 are being joined by the union and each has a radiused (ogee) flare 98 which is backed up by like abuting surfaces 100 on sleeves 20 and 92. Annulus 90 is similar to annulus 14 in that the radiused sealing surface is repeated at 102 at each end. The radiused sealing surfaces will be described in more detail in connection with FIGURE 8. The interior diameters of annuluses 14 and 90 are shown to be equal to the interior diameters of the tube sections they join. It is contemplated that the annuluses on occasion may be used to house operating mechanisms such as an orifice, a pressure regulator, or a swing or ball check valve.

*Results*

The weight savings relative to AN fittings range between approximately ⅓ and ⅔. The following table is a comparison of weight savings for 1¼" 24ST6 aluminum alloy fittings:

TABLE 1

| Item | Lbs. | Percent Savings |
|---|---|---|
| AN 821 Elbow | 0.710 | |
| Figure 1 Elbow | 0.458 | 35.5 |
| AN 815 Union Coupling | 0.528 | |
| Figure 7 Union Coupling | 0.185 | 65.0 |

A 1¼" 0.185 lb. union coupling, following the construction of FIGURE 1, in test had sufficient strength to burst 1¼ x .065 wall 5052 aluminum alloy tubing without coupling leakage, significant coupling deformation, or sealing surface galling. This strength more than satisfies the requirement for fluid couplings given by MIL–F–5506A. The union was torqued to 448 lb.-in. after MIL–C–5544 thread lubricant had been applied. The calibrated p.s.i. was 2920 when the tube burst. The nut exterior diameter, measured on two diameters at 90° to each other, was 1.8995" and 1.902" before pressure was applied and, respectively, 1.901" and 1.901" when the tube burst.

*Figures 8 and 9.—Sealing surfaces*

As before stated prior couplings having flared tubes, including AN types, commonly have used conical configurations on tube ends and fitting sealing surfaces. It is considered of primary importance to instead use radiused surfaces on the tubing flares and on the mating fitting parts, e.g., annuluses 14, 90. In forming the tube ends, an ogee flare is formed with less stress concentration than a truncated cone flare because the metal develops more hoop strength with the radiused flare. This inherent strength results from the action of the flowing metal during forming of the flared tube end in which the metal tends to return back around the locus of the bend. In forming a truncated cone flare, instead the metal is subjected to increased strain as it flows away from the tube to form the lip of the flare. In other words the spherical flare on the tube is formed more by tension and less by shear than the conical flare and more uniform flares are produced in a shop.

In an installed union or fitting, the phenomena may be compared to what happens during the formation of the tube flare. Some departure from nominal dimensions will occur in the tube flare and the sealing surfaces of the annuluses 14 and 90 due to manufacturing tolerances. During coupling torquing, the radiused flare will tend to accommodate the necessary deformation (due to manufacturing tolerances) by tensile action, whereas a conical configuration will tend to accommodate deformation by shearing. The radiused system will tend to seal by surface area whereas the conical seal will tend to have only a line contact. In other words, the radiused configuration better accommodates coupling because deformation is primarily in tension, whereas the conical surfaces tend to shear.

The advantages of my radiused sealing surface system are partly inherent in radiused configurations and are partly attributable to the particular structural relationships detailed in FIGURE 8. As related above these advantages include more uniform tube flares and better accommodation of manufacturing tolerances because the tube is tensed rather than sheared during coupling torquing and tends to produce surface rather than line contact. Other advantages and analyses will be set forth below.

Referring to FIGURE 8, the outer end portion 108 of the tubing flare 98 "looks" parallel to the tube axis if the flare has a 90° radius, e.g., a tangent to the curve at the end of the flare is substantially parallel to the tube axis. The end of a conical tubing flare instead "looks" in a direction making a substantial angle to the tube axis, e.g., at an angle of half of the included, apex angle of the cone. For example, an AN flare is commonly disposed at a 37° angle to the tube axis. Because the radiused flare looks parallel to the tube axis, it can be drawn or forced over the mating annulus, whereas the action with an outwardly looking conical flare is mostly one of compression against the mating annulus. Dotted line 109 can be taken as representative of the dispositions of a conical flare element and it will be observed that torquing will result mostly in compression and not in a tensing or drawing action.

The tensing and drawing action best occurs near the outer portion 108 of flange 98, i.e., if the parts were abutted at the middle of the ogee bend a compressive relationship between sleeve 20, flare 98, and annulus 90 would occur somewhat similar to that described above in connection with a conical flare. Therefore, the parts preferably are dimensioned and arranged so that before torquing the end portion 108 of tube flare 98 first abuts annulus 90 on a line at 111 inside of the area of annulus 90 of greatest diameter. This may be accomplished as shown by radiusing the outer portion of tube flare 98 about center C1 and using the same length radius for annulus 90 about center C2. Providing that the maximum (outer) diameter of flare 98 is about equal to the maximum diameter of annulus 90, it necessarily follows that the line contact at 111 will result. Sleeve 20 should be closely fitting at an end sleeve portion 113 thereof in the same area. Then, as the assembly is torqued, the outer end portion 108 will be pinched between sleeve portion 113 and annulus 90 and will be pushed or drawn over the annulus to a position such as shown by dotted lines 115 stretched over annulus 90 and making surface area contact therewith. The end sleeve portion 113 will also tend to be tensed and expanded and to assume the position shown by dotted lines at 117.

In some of the claims it is stated that each sealing surface on the sides of annulus 90 or on one side of annulus 14 is generally quarter circular in radial cross section and that the outer portion of the tube flare is generally similar. While generally descriptive for purposes of this description and for the claims, the expression is to be interpreted as being limiting only to the extent necessary to obtain the relationships described in connection with FIGURE 8, e.g., that the end of flare 98 "looks" generally parallel to the axis of the assembly, that a tangent to the maximum diameter part of the annulus is generally parallel to the axis of the assembly, and that inner portions of the flare and the annulus are arcuate so that flare 98 can be stretched over the annulus. The statement is not restrictive as to the following: (a) Although circular arcs are most convenient for manufacture, other arcs such as elliptical are included, and (b) the arcs may be less than 90°, i.e., in FIGURE 8 the arc on the annulus is less than 90° and the arc length is even less on the flare because it has ogee configuration.

A test example is shown by an assembly of the type shown in FIGURE 7 that was torqued to 900 lb.-in. in the test setup of FIGURE 9. When disassembled, end flange portion 108 had been expanded 1/32" and annulus 90 was so firmly engaged in the end of one tube flare that it could not be disengaged by moderate finger pressure, whereas a conical AN assembly torqued to 900 lb.-in. in an identical setup did not have measurable increase in flange diameter and the parts freely separated upon disassembly of the coupling. The conical surfaces had been coated with Prussian blue and a single line contact appeared to be observable on the sealing surfaces. In torquing the two unions, the FIGURE 7 assembly was characterized by the longer travel of the nut before the 900 lb.-in. torque reading was reached, compared to the AN union, again a factor indicative of the stretching of the radiused flare over annulus 90.

The divergence of the adjacent surfaces of tube flare 98 and annulus 90 from initial contact line 111 does not have to be proportionally as great as shown in FIGURE 8 or be accomplished by exactly the same system, provided (a) the line 111 appears adjacent the outer end of flange 98, (b) sleeve 20 in the same area is in position to apply effort to stretch flange 98 on the annulus, and (c) some divergence is present inside of line 111. Although generally descriptive, it is not strictly accurate to term area 111 as a line because line contact would be present before torquing only if no manufacturing tolerances or tube misalignment were present.

In a second test example, a union was tested having relative dimensions substantially according to FIGURES 7 and 8 except less clearance was provided between the heels of the flanges and the annulus and the end internal diameters of the flanges were more nearly equal to, although less than, the annulus maximum diameter. The annulus maximum diameter was 1.458". A first tube end flare, of good concentricity, had an internal diameter of 1.445" before assembly and 1.454" internal diameter upon disassembly, showing a net expansion of .009". The tube flare was brought over the annulus maximum diameter, indicating that the tube flare resiliently contracted upon disassembly. The second tube end flare was somewhat eccentric and of smaller size. The average internal diameter before assembly was 1.428" and the average internal diameter upon disassembly was 1.461", showing a net expansion of .033" and indicating an expansion beyond the elastic limits of the metal. Prussian blue was applied to the mating surfaces and a good surface area contact of about 1/8" width appeared to be demonstrated, which is to be contrasted with the line contact shown with a conically flared fitting, as set forth above. As in the previous example, the annulus was seized so firmly in one tube flare that it could not be separated by finger pressure. These results show stretching of tube flares over an annulus, the seizure of the annulus by the tube flares, the adaptability for misalignment and manufacturing tolerances, the desirable relative dimensions, and the achievement of surface area sealing contact.

The sealing problem is aggravated by tube misalignment, such as angular or displacement misalignment of tube axes 110, 112 in FIGURES 7 and 9. Such angular misalignment means that at least one of the axes 110, 112 will not be 90° to the central diameter 116 of annulus 90. When line contact is established between a tube flare and an annulus not in 90° relationship, line 111 becomes elliptical rather than circular. If annulus 90 were radiused on a radius having its center at the axis of the annulus, then line 111 would be circular despite misalignment with the axis of the tube, e.g., this would be a ball and socket relationship. The radiused annulus 90 is more like a ball than a conical annulus and this means, other factors being the same, that less distortion is required to effect initial line contact at 111 with a radiused annulus and flare than with a conical annulus and flare. Therefore, the radiused annulus and tube flares of the present invention are more adaptable to tube misalignment than the prior conical annulus and tube flares.

The setup of FIGURE 9 shows a maximum misalignment test assembly for aircraft in which axes 110 and 112 are 2" out of alignment and adjacent clamps 120 in the area of the bend are 23½" apart. The test results set forth above were achieved for a coupling of my invention and for an AN coupling.

Having thus specifically described my invention, I do not wish to be understood as limiting myself to the precise details of construction shown, but instead wish to cover those modifications thereof which will occur to those skilled in the art from my disclosure and which fall within the scope of my invention, as described in the following claims.

I claim:
1. A lightweight coupling joining a fitting such as an elbow, T or Y to a straight tube, comprising: an annular part having a counterbore in one end and said fitting having a branch of tubular configuration secured in said counterbore, said tube having a flared end and the other end of said annular part facing the tube flare being radiused producing a generally quarter circular outline in radial section, the outer portion of said flare being radiused generally similarly to said annular part, the tube before the coupling is tightened making contact with said annular part only at the end of the flare and on a line on said annular part of less diameter than the greatest diameter of said annular part, said end of said flare "looking" substantially parallel to the tube axis before the coupling is tightened whereby when the coupling is tightened the tube flare may be stretched over said annular part by pressure applied at said end of said flare producing surface contact therebetween, the radiuses being shorter than would be required for the centers of the radiuses to lie substantially on the longitudinal axis of said tube, a sleeve on said tube generally fitting said tube exterior surfaces and said flare, the inner surface of said sleeve closely fitting said outer portion of said flare whereby in tightening of said coupling said end of said flare is pinched between said sleeve and said annular part and said flare is drawn onto said annular part and both said flare and abutting portion of said sleeve are expanded, said annular part having a medial annular shoulder, a gland stud and a gland nut one of which is disposed on said sleeve and the other of which is disposed on said annular part abutting said shoulder, said stud and nut having overlapped threaded areas whereby said coupling is tightened when said stud and nut are torqued.

2. A lightweight fluid coupling joining a fitting such as an elbow, T or Y to a straight tube, comprising: an annular part having a counterbore in one end and said fitting having a branch of tubular configuration secured in said counterbore, said tube having a flared end and the other end of said annular part facing the flare of said tube being radiused, the outer portion of said tube flare being radiused generally similarly to said annular part, the tube before the coupling is tightened making contact with said annular part only at the end of the flare and in an area of said annular part of less diameter than the greatest diameter of said annular part, said end of said flare "looking" substantially parallel to the tube axis before the coupling is tightened whereby when the coupling is tightened the tube flare may be stretched over said annular part by pressure applied at said end of said flare and producing sealing contact therebetween, the radiuses being shorter than would be required for the centers of the radiuses to lie substantially on the longitudinal axis of said tube, a sleeve on said tube generally fitting said tube exterior surfaces and said flare, the inner surface of said sleeve closely fitting said outer portion of said flare whereby in initial tightening of said coupling said end of said flare is pinched between said sleeve and said annular part and said flare is drawn onto said annular part, and nut means acting between and drawing said sleeve toward said annular part, said sleeve and said nut each having a torquable head for a coupling member comprising, an annular body portion having a circular peripheral outer groove concentrically formed therein, said circular peripheral outer groove being of a rectangular cross-section, said annular body portion having at least two oppositely disposed recesses formed in the outer periphery thereof communicating with said circular peripheral outer groove, each of said recesses being rectangular in cross-section and extending axially of said coupling member on either side of said circular peripheral outer groove, said recesses being adapted to receive and mate with a pair of oppositely disposed broad rectangular lugs of a spanner wrench, and said circular peripheral outer groove being adapted to receive and guide a pair of oppositely disposed spanner wrench rectangular tangs, one of said tangs being connected to a corresponding one of said lugs of said spanner wrench, and each of said recesses having a flat bottom adapted to have a corresponding portion of a corresponding one of said lugs bear thereagainst.

3. A lightweight fluid coupling for joining the ends of a pair of tubes, comprising: an annulus disposed between the tube ends, the side of said annulus facing each tube being radiused so that a radial section through the annulus produces an outline on each side which is generally quarter circular, the mating end of each tube being flared with the outer portion of the flare being radiused generally similarly to said annulus, the tube before the coupling is tightened making contact with said annulus only at the end of the flare and on a line on said annulus spaced from the area of said annulus of greatest diameter, said end of said flare "looking" substantially parallel to the tube axis before the coupling is tightened whereby when the coupling is tightened the tube end flares may be stretched over said annulus by pressure applied at said outer portion of each flare producing surface contacts therebetween, a sleeve on each tube generally fitting said tube exterior surfaces and said flares, the inner surfaces of said sleeves closely fitting the outer portions of said flares, whereby in tightening of said coupling said outer portions of said flares are pinched between said sleeves and said annulus and said flares are drawn onto said annulus and both said outer portions of said flares and abutting portions of said sleeve are expanded, the radiuses being shorter than would be required for the centers of the radiuses to lie substantially on the longitudinal axes of said tubes, a gland stud on one sleeve and a gland nut on the other sleeve, said stud and nut having overlapping threaded areas whereby said coupling is tightened when said stud and nut are torqued.

4. A lightweight fluid coupling for joining the ends of a pair of tubes, comprising: an annulus disposed between the tube ends, the side of said annulus facing each tube being radiused, the mating end of each tube being flared with the outer portion of the flare being radiused generally similarly to said annulus, the tube before the coupling is tightened making contact with said annulus only at the end of the flare and on a portion of said annulus spaced from the area of said annulus of greatest diameter, said end of said flare "looking" substantially parallel to the tube axis before the coupling is tightened whereby when the coupling is tightened the tube end flares may be stretched over said annulus by pressure applied at said outer portion of each flare producing sealing contacts therebetween, a sleeve on each tube generally fitting said tube exterior surfaces and said flares, the inner surfaces of said sleeves closely fitting the outer portions of said flares, whereby in tightening of said coupling said outer portions of said flares are pinched between said sleeves and said annulus and said flares are drawn onto said annulus, the radiuses being shorter than would be required for the centers of the radiuses to lie substantially on the longitudinal axes of said tubes, and nut means acting between and drawing together said sleeves for tightening of said coupling.

5. The improvement in a coupling in which a flared tube is sealed against an interior annular coupling part, comprising: the side of said annular part facing the flare of said tube being radiused so that a radial section through said annular part produces an outline on said side which is generally quarter circular, the outer portion of said tube flare being radiused generally similarly to said annular part, the tube before the coupling is tightened making contact with said annular part only at the end of the flare and on a line on said annular part of less diameter than the greatest diameter of said annular part, said end of said flare "looking" substantially parallel to the tube axis before the coupling is tightened whereby when the coupling is tightened the tube flare may be stretched over said annular part by pressure applied at said end of said flare producing surface contact therebetween, a sleeve on said tube generally fitting said tube exterior surfaces and said flare, the inner surface of said sleeve closely fitting said outer portion of said flare whereby in initial tightening of said coupling said outer portion of said flare is pinched between said sleeve and said annular part and as the parts move together said flare is drawn onto said annular part and both said flare and abutting portions of said sleeve are expanded, the radiuses being shorter than would be required for the centers of the radiuses to lie substantially on the longitudinal axis of said tube, and nut means acting between and drawing said sleeve toward said annular part.

6. The improvement in a coupling in which a flared tube is sealed against an interior annular coupling part comprising: the side of said annular part facing the flare of said tube being radiused, the outer portion of said tube flare being radiused generally similarly to said annular part, the tube before the coupling is tightened making contact with said annular part only at the end of the flare and in an area of said annular part of less diameter than the greatest diameter of said annular part, said end of said flare "looking" substantially parallel to the tube axis before the coupling is tightened whereby when the coupling is tightened the tube flare may be stretched over said annular part by pressure applied at said end of said flare and sealing contact will be produced between said flare and said annular part by means of the stretching action, a sleeve on said tube on the opposite side of the flare from said annular part and said sleeve generally fitting said tube exterior surfaces and said flare, the inner surface of said sleeve closely fitting said outer portion of said flare whereby in initial tightening of said coupling said outer portion of said flare is pinched between said sleeve and said annular part and as the parts move together said flare is drawn onto said annular part, and nut means acting between and drawing said sleeve toward said annular part, said sleeve and said nut each having a torquable head for a coupling member comprising, an annular body portion having a circular peripheral outer groove concentrically formed therein, said circular peripheral outer groove being of a rectangular cross-section, said annular body portion having at least two oppositely disposed recesses formed in the outer periphery thereof communicating with said circular peripheral outer groove, each of said recesses being rectangular in cross-section and extending axially of said coupling member on either side of said circular peripheral outer groove, said recesses being adapted to receive and mate with a pair of oppositely disposed broad rectangular lugs of a spanner wrench, and said circular peripheral outer groove being adapted to receive and guide a pair of oppositely disposed spanner wrench rectangular tangs, one of said tangs being connected to a corresponding one of said lugs of said spanner wrench, and each of said recesses having a flat bottom adapted to have a corresponding portion of a corresponding one of said lugs bear thereagainst.

7. A torquable head for a coupling member comprising, an annular body portion having a circular peripheral outer groove concentrically formed therein,
said circular peripheral outer groove being of a rectangular cross-section,
said annular body portion having at least two oppositely disposed recesses formed in the outer periphery thereof communicating with said circular peripheral outer groove,
each of said recesses being rectangular in cross-section and extending axially of said coupling member on either side of said circular peripheral outer groove,
said recesses being adapted to receive and mate with a pair of oppositely disposed broad rectangular lugs of a spanner wrench, and
said circular peripheral outer groove being adapted to receive and guide a pair of oppositely disposed spanner wrench rectangular tangs,
one of said tangs being connected to a corresponding one of said lugs of said spanner wrench, and
each of said recesses having a flat bottom adapted to have a corresponding portion of a corresponding one of said lugs bear thereagainst.

8. A torquable coupling head as set forth in claim 7, wherein
said recesses are diametrically opposite.

9. A torquable coupling head as set forth in claim 8, wherein
said flat bottom of each of said opposite recesses defines a plane that is perpendicular to a diameter of said circular groove.

10. A torquable coupling head as set forth in claim 7, wherein
said annular body portion has a plurality of equi-angularly spaced recesses formed in the periphery thereof and symmetrically formed on either side of said circular groove in such a manner that the tangs of the spanner wrench are guided by the walls of said circular groove.

11. A torquable coupling head as set forth in claim 10, wherein
said circular groove is formed by a pair of relatively thin parallel flanges that comprise a part of said annular body portion, and wherein
each of said recesses are defined by a bottom wall and two parallel walls in each flange.

References Cited by the Examiner

UNITED STATES PATENTS

| | | | |
|---|---|---|---|
| 577,413 | 2/1897 | Bray | 285—39 |
| 969,422 | 9/1910 | Tanner et al. | 285—334.5 |
| 1,527,772 | 2/1925 | Braid | 81—90 |
| 1,836,716 | 12/1931 | Huthsing | 285—39 |
| 1,936,359 | 11/1933 | Huthsing | 285—39 |
| 1,977,241 | 10/1934 | Parker | 285—334.5 |
| 2,032,720 | 3/1936 | Sander | 285—334.4 |
| 2,335,040 | 11/1943 | Bruno | 285—334.4 |
| 2,413,089 | 12/1946 | Vaught | 285—334.5 |
| 2,466,317 | 4/1949 | Kane | 285—334.5 |
| 2,523,578 | 9/1950 | Lewis | 285—334.5 X |
| 2,534,199 | 12/1950 | Guarnaschelli | 285—334.5 |
| 2,784,637 | 3/1957 | Smisko | 85—32 |
| 2,889,733 | 6/1959 | Vanderhoof | 85—32 |
| 2,946,607 | 7/1960 | Bauer | 285—334.5 |
| 3,003,379 | 10/1961 | Pribitzer | 81—90 |

FOREIGN PATENTS

| | | |
|---|---|---|
| 1,193,927 | 5/1959 | France. |
| 2,897 | 2/1896 | Great Britain. |

CARL W. TOMLIN, *Primary Examiner.*

S. R. MILLER, J. B. SCHWOYER,
*Assistant Examiners.*